US006409868B1

(12) United States Patent
Edger

(10) Patent No.: US 6,409,868 B1
(45) Date of Patent: Jun. 25, 2002

(54) WINDOW FRAME AND METHOD OF FABRICATING SAME

(75) Inventor: Ronald Fredrick Edger, Woodbrige (CA)

(73) Assignee: Royal Group Technologies Limited, Woodbridge (CA)

( * ) Notice: Subject to any disclaimer, the term of this patent is extended or adjusted under 35 U.S.C. 154(b) by 35 days.

(21) Appl. No.: 09/666,077

(22) Filed: Sep. 21, 2000

(30) Foreign Application Priority Data

Sep. 21, 1999 (CA) .......................................... 2282989

(51) Int. Cl.[7] .......................... E06B 1/26; B29C 47/00

(52) U.S. Cl. .......................... 156/244.18; 156/244.25; 156/258; 156/266; 156/267; 156/304.2

(58) Field of Search .......................... 52/204.1, 209.5, 52/204.55, 745.19, 656.5, 656.9; 403/401, 403, 404; 156/244.18, 244.25, 244.24, 256, 258, 264, 266, 267, 304.2, 304.6

(56) References Cited

U.S. PATENT DOCUMENTS 6,234,999 B1 * 6/2001 Silverman ................ 52/204.51

* cited by examiner

*Primary Examiner*—Michael W. Ball
*Assistant Examiner*—Barbara J Musser

(57) ABSTRACT

A method of fabricating a rectilinear window frame comprising cutting a length of extruded frame profile having a body portion and an integral nailing fin into four lengths from opposite sides of the profile at forty-five degrees (45°) with the cuts meeting at a point intermediate the width of the nailing fin, then assembling the four sections into the rectangular frame. The invention is also directed to frames produced by such method.

4 Claims, 2 Drawing Sheets

FIG. 1.
PRIOR ART
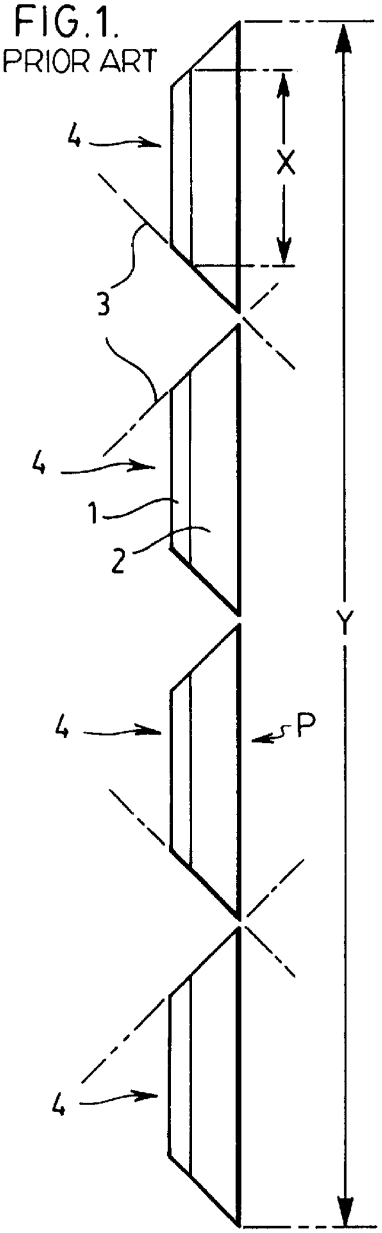
FIG. 3.
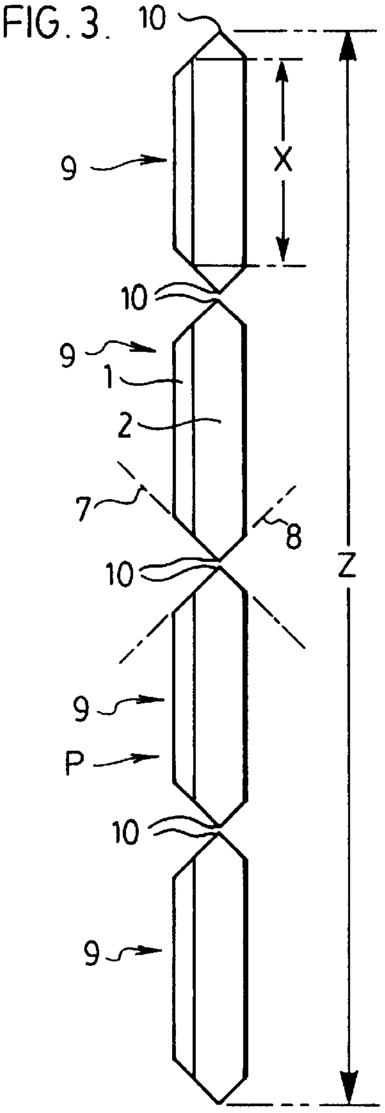
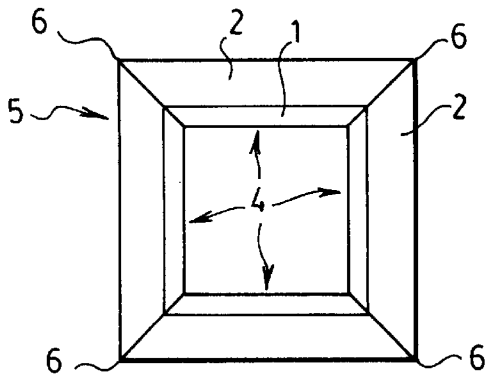
FIG. 2 PRIOR ART
FIG. 4.
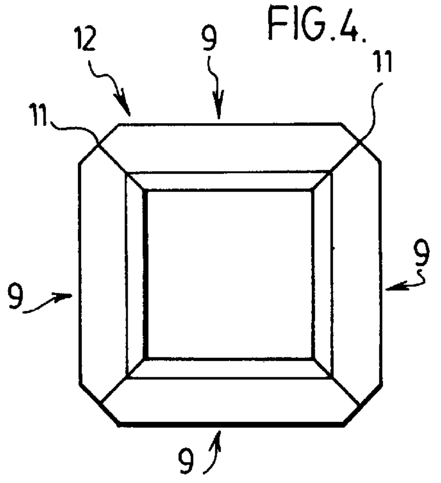

WINDOW FRAME AND METHOD OF FABRICATING SAME

FIELD OF THE INVENTION

This invention relates to window frames which incorporate an integral nailing fin and includes such window frames that also incorporate an integral J-channel to overlap the ends or edges of siding applied around the window opening.

More particularly, the invention is directed to providing a significant saving in the material required to form such window frames and to facilitating their fabrication.

BACKGROUND OF THE INVENTION

Conventional window frames with integral nailing fins including those with integral J-channels are formed as longitudinal vinyl extrusions having a desired cross sectional profile and a length equal to the length presently deemed required so that it can be cut into four sections for assembly into the window frame to fit into the window opening with the nailing fin circumscribing the window opening.

To provide the required four sections, the profile is cut at angles inclined at forty-five degrees (45°) to its length from the inner edge of the body portion of the profile out to the outer edge of the nailing fin so that each section comprises a bi-laterally symmetrical trapezoid. These sections are then welded together to provide a rectangular frame having right angled corners including the corners of the nailing fin.

Thus with the present fabricating procedure where the window frame is to provide a square frame opening of 10 inches and the nailing fin is to be 1½ inches wide, the length of the profile required is four times the 10 inches plus eight times the width of the nailing fin or 40 inches plus 12 inches giving a total of 52 inches.

The welding of the abutting 45 degree edges of the abutting frame sections to include the abutting edges of the nailing fins is difficult, particularly as the nailing fins have a degree of flexibility which increases out to the outer edges. Thus, it is difficult to obtain a proper or complete weld out to the very comers of the nailing fins.

Moreover, these welded sharp right angled comers of the projecting flexible nailing fins of the frame are easily damaged in handling.

SUMMARY OF THE INVENTION

The present invention resides in cutting the longitudinal window frame profile in a manner to significantly reduce the length of profile material required to form the window frame for a given size of window and window opening.

It will be under stood that as the complexity of the cross sectional configuration of the window frame increases the greater is the saving of material by the ability to reduce the length of profile for a given window size.

Thus, for example, where the window frame includes an integral J-channel, particularly if the J-channel has a complicated formation such a double walled configuration, the saving of material is greatly increased.

More particularly, the invention resides in cutting the length of profile from opposite sides at 45 degrees with the cuts meeting in an intermediate point of the nailing fin so that each of the four sections required to complete the window frame present at each end thereof a right angled triangle having its apex at the intermediate point of the width of the nailing fin. This cutting reduces the length of profile required as compared to conventional cutting by eight times the width of that portion of the nailing fin from such intermediate point to the outer edge of the nailing fin.

Thus, as an example, in the case of the window frame having a frame opening of 10 inches square and a nailing fin having a width of 1½ inches discussed above, if the intermediate point of the nailing fin where the cuts meet is chosen to be the mid-point of the nailing fin the length of profile required to provide the four window frame lengths to complete the frame is four times 10 inches plus eight times ½ the width of the nailing fin or ¾ of an inch. Thus the total length of profile required is only 46 inches as compared to the standard 52 inches.

By providing the window frame sections with the nailing fins having the right angled triangular ends, the sections form when assembled together 45 degree bevelled corners where the abutting surfaces to be welded are only a fraction, e.g. in the example given only one half the length of conventional window frames and there is no welding of any sharp flexible corners as in conventional frames, thus simplifying and facilitating their fabrication.

BRIEF DESCRIPTION OF THE DRAWINGS

FIG. 1 is a diagrammatic view of a length of profile cut in the conventional manner into four sections for assembly into a window frame having a body portion for insertion into a square window receiving opening in the wall of a structure to circumscribe the interior of the wall opening and an integral nailing fin for circumscribing the perimeter of the wall opening.

FIG. 2 is a diagrammatic view of the cut segments of FIG. 1 assembled into the window frame with integral nailing fin.

FIG. 3 is a diagrammatic view of an optimized cutting of a window frame profile into four sections according to the invention to fit the same window receiving opening as described in FIG. 1.

FIG. 4 is a diagrammatic view of the four sections of FIG. 3 assembled into the window frame.

Figure 5:
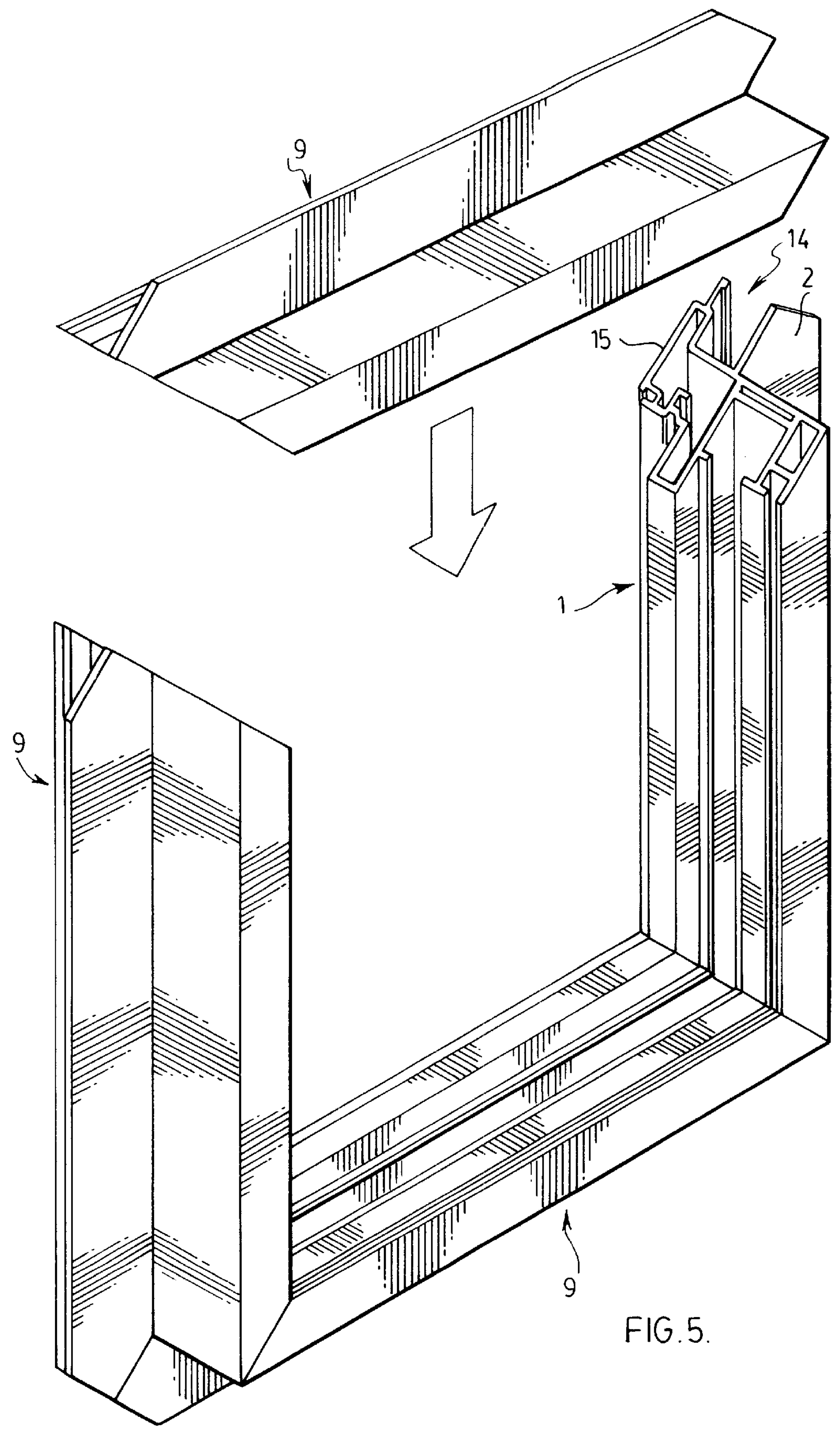
FIG. 5 is a perspective view of a window frame being assembled, the frame profile having been cut according to FIG. 3 with the top or header section of the window frame about to be assembled with the previously assembled sill and jamb sections.

DETAILED DESCRIPTION ACCORDING TO THE PREFERRED EMBODIMENTS OF THE PRESENT INVENTION

FIG. 1 illustrates how a length of window frame profile P comprising a body portion 1 and a nailing fin 2 is conventionally cut as indicated by the dotted cut lines 3 which are inclined at forty-five degrees (45°) to the length of the profile to cut, in the case of a square window frame for insertion into a square opening in the wall of a structure into four sections 4 shaped in the form of four bilaterally symmetrical trapezoids. These four sections are then welded together to form the square frame 5 designated in FIG. 2 with the body portion of the frame formed by the welded body portions 1 of the sections 4 adapted to be inserted into the window receiving wall opening to circumscribe the perimeter of the wall opening while the nailing fins 2 of the sections circumscribe the perimeter of the wall opening.

As seen in FIG. 2, the corners of the welded nailing fin portions 2 of the sections 4 form right angled corners 6. As the nailing fins 2 have a measure of flexibility welding to the comers 6 is difficult and these sharp corners are subject to damage during handling of the frame.

As an example, in the case of the window frame which is to be inserted into a square window receiving opening in a wall whose dimensions are X with X being 10 inches and with a conventional nailing fin whose width is 1½ inches the required length Y of the profile to fabricate the window frame is four times 10 inches plus eight times the width of the nailing fin, that is eight times 1½ inches or 12 inches making a total required length of 40 plus 12 inches or 52 inches.

In this conventional cutting of the profile length, the forty-five degree (45°) cuts proceed from what is the inside of the body portion 1 of the profile through to the outer edge of the nailing fin 2.

FIG. 3 represents an example of the cutting of the window frame profile P in accordance with the invention to significantly reduce the length of profile required to fit the same window receiving wall opening as the frame formed from the cut sections illustrated in FIG. 1.

In the case of FIG. 3, the cutting of the profile is effected by cutting on the dotted cut lines 7 and 8. The cuts on the line 7 are inclined at forty-five degrees (45°) to the length of the FIG. 3 profile P from the inner edge of the body portion 1 through to a point which is intermediate of the width of the nailing fin 2 while the cut lines 8 are cut at forty-five degree (45°) angles to the length of the profile from the outer edge of the nailing fin 2 to meet at such intermediate point of the width of the nailing fin so that each of the sections 9 formed by this optimized cutting provides a nailing fin 2 which has right angular ends with the apex 10 lying on the selected intermediate point of the nailing fin.

Thus, when the sections 9 are assembled together into the window frame as illustrated in FIG. 4, the corners 11 of the assembled frame 12 are bevelled at forty-five degrees (45°). This arrangement facilitates the welding of the flexible nailing fin sections and eliminates the sharp frame corners designated at 6 in FIG. 2.

By cutting the profile P as illustrated in FIG. 3, and as an example having selected the annex 10 to lie on the mid-point of the width of the nailing fin, the required length Z of the profile P needed to fabricate the window frame 12 illustrated in detail in FIG. 4 would be four times the length of the body portion 1 which in the case of the illustration given above for a window frame to fit a ten inch square opening in a wall is 40 inches plus eight times one-half the width of the nailing fin 2 or 6 inches giving a total dimension Z of 46 inches resulting in a saving of 6 inches of profile length providing a significant saving in the amount of material required to form the window frame.

It will be understood that the closer the apex 10, that the closer the cuts 7 and 8 are to the body portion of the profile P, the greater will be the saving of material. However, the apex 10 must be spaced from the body 1 to provide adequate space for caulking at the comers of the frame 12. A typical cutting of the profile P would be having the apex 10 lying on the midpoint of the width of the nailing fin.

As discussed above, if the apex 10 is moved closer to the body portion, the saving of material will be increased. On the other hand, if for some reason a wider corner is required and the apex 10 is moved outwardly of the midpoint of the nailing fin, the saving of material will be accordingly reduced.

It will be understood that as the window frame complexity increases the ability to produce the frame from a significantly shorter length of profile provides a very important saving.

FIG. 5 illustrates a window frame in the course of being assembled from sections 9 cut according to the optimized cutting of FIG. 3 when the apex 10 lies at the midpoint of the width of the nailing fin. In this case, the body portion 1 includes a support structure for receiving and supporting a window (not shown) and projecting outwardly from the body portion is a J-return portion 14 including a double walled section 15. This J-return 14 forms with the nailing fin 2 a J-channel to receive and cover the ends of siding.

It will be understood that the profile may be such as to receive and support one or more windows and may have a single wall J-return or even without a J-return.

The invention is particularly applicable to window frames formed of extruded vinyl but it is also applicable to extruded aluminum frames or lengths of profile of other material.

Although various embodiments of the present invention have been described herein in detail, it will be appreciated by those skilled in the art, that variations may be made thereto without departing from the scope of the appended claims.

The embodiments of the invention in which an exclusive property or privilege is claimed are defined as follows:

1. A method of fabricating a window frame of extrudable material, said frame having a body portion for insertion into a rectangular window opening and an integral nailing fin for circumscribing the window opening comprising extruding a length of profile having a cross sectional configuration corresponding to the desired window frame body portion and an integral nailing fin, the length of said profile being equal to the perimeter of the opening into which the body portion of said frame is to be inserted plus eight times a selected fraction of the width of the nailing fin, cutting said profile from opposite sides thereof at angles inclined at forty-five degrees (45°) to the length of said profile with the cuts meeting at a point in the nailing fin which is at said selected fraction of the width of the nailing fin to form four frame sections whose nailing fin ends are right angled triangles having their apexes at said point in said nailing fin, welding said four frame sections together to form the window frame and a circumscribing integral nailing fin.

2. A method as claimed in claim 1 in which said profile includes an integral J-channel.

3. A method as claimed in claim 2 in which said integral J-channel has a double wall.

4. A method as claimed in claims 1, 2 or 3 in which said apexes lie at the midpoint of the width of said nailing fin.

* * * * *